US 12,351,365 B2

(12) United States Patent
Matera et al.

(10) Patent No.: US 12,351,365 B2
(45) Date of Patent: Jul. 8, 2025

(54) STORAGE BIN

(71) Applicant: Rivian IP Holdings, LLC, Plymouth, MI (US)

(72) Inventors: Matthew Matera, Newport Beach, CA (US); Bar Sarig, Aliso Viejo, CA (US); Jed McCann, Portland, OR (US)

(73) Assignee: Rivian IP Holdings, LLC, Plymouth, MI (US)

( * ) Notice: Subject to any disclaimer, the term of this patent is extended or adjusted under 35 U.S.C. 154(b) by 174 days.

(21) Appl. No.: 17/973,744

(22) Filed: Oct. 26, 2022

(65) Prior Publication Data
US 2024/0140649 A1     May 2, 2024

(51) Int. Cl.
*B60P 7/08* (2006.01)
*B60R 5/00* (2006.01)
*B65D 25/20* (2006.01)
*B60R 11/00* (2006.01)

(52) U.S. Cl.
CPC ............ *B65D 25/20* (2013.01); *B60P 7/0815* (2013.01); *B60R 5/006* (2013.01); *B60R 2011/0059* (2013.01)

(58) Field of Classification Search
CPC ........... B60P 7/0815; B60R 2011/0059; B60R 2011/0071; B60R 5/00; B60R 5/003; B60R 5/006
USPC ....................................... 248/229.11, 229.21
See application file for complete search history.

(56) References Cited

U.S. PATENT DOCUMENTS

| | | | | |
|---|---|---|---|---|
| 4,249,684 A | * | 2/1981 | Miller | B60R 9/00 410/82 |
| 5,947,356 A | * | 9/1999 | Delong | B60R 9/00 403/374.5 |
| 6,161,262 A | * | 12/2000 | Pfister | F16M 13/022 248/229.11 |
| 6,786,374 B2 | * | 9/2004 | Schlecht | B60R 5/04 296/37.16 |

(Continued)

FOREIGN PATENT DOCUMENTS

| | | | | |
|---|---|---|---|---|
| GB | 2338177 A | * | 12/1999 | ............ A45C 13/36 |
| JP | H0544787 U | * | 6/1993 | |

OTHER PUBLICATIONS

"My Experience from First Mobile Service Appointment Apr. 6, 2022." Rivian Forums—R1T & R1S Owners, News, Discussions, RIVN Stock, Apr. 7, 2022, https://www.rivianforums.com/forum/threads/my-experience-from-first-mobile-service-appointment-4-6-2022.4553/. Retrieved on Nov. 3, 2022.

*Primary Examiner* — Scott T McNurlen
(74) *Attorney, Agent, or Firm* — Haley Guiliano LLP

(57) ABSTRACT

Example illustrations herein are directed to an apparatus comprising a bin, and an expansion clamp coupled to a base of the bin. The expansion clamp is configured to be extended from the base to secure the base to a slot. The apparatus also includes a lever of the bin configured to actuate the expansion clamp. Other examples are directed to a storage bin that comprises a base, a frame extending from the base, one or more flexible walls retained by the frame, and an expansion clamp coupled to the base. The expansion clamp may be configured to be extended from the base to secure the base to a slot. The storage bin may also include a lever on an outer surface of the bin, the lever configured to actuate the expansion clamp.

17 Claims, 11 Drawing Sheets

(56) References Cited

U.S. PATENT DOCUMENTS

| | | | |
|---|---|---|---|
| 7,416,098 B2 * | 8/2008 | Settelmayer | B60R 9/058 |
| | | | 224/319 |
| 9,956,920 B2 * | 5/2018 | Maguire | B60R 9/045 |
| 2003/0067184 A1 * | 4/2003 | Anderson | B60P 7/08 |
| | | | 296/37.6 |
| 2007/0075107 A1 * | 4/2007 | Brancheriau | B60N 2/773 |
| | | | 224/281 |

\* cited by examiner

STORAGE BIN

INTRODUCTION

The present disclosure is directed to a bin, e.g., for a vehicle, and more particularly to a bin that can be removably secured to a surface.

SUMMARY

Auxiliary storage areas of a vehicle may generally have unique shapes or volumes for storing gear or vehicle accessories, as well as different modes of storage or accessories for facilitating storage. A movable platform or shuttle for an auxiliary storage area of a vehicle may allow gear to be stowed and accessed relatively easily by sliding the platform into/out of the storage area. However, gear or other objects stowed on the platform may be prone to falling from the movable platform unless strapped to the movable platform, limiting utility of the movable platform.

Accordingly, in at least some example illustrations herein, an apparatus is provided comprising a bin, and an expansion clamp coupled to a base of the bin. The expansion clamp is configured to be extended from the base to secure the base to a slot. The apparatus also includes a lever of the bin configured to actuate the expansion clamp.

In at least some examples, the apparatus comprises a linkage configured to convert rotational motion of the lever to a linear motion of the expansion clamp.

In at least some example approaches, the apparatus includes a linkage connecting the lever to the expansion clamp and a slidable member secured to the linkage with a pivot, with the slidable member including a cam configured to push a plunger of the expansion clamp. The push causes the plunger to extend further into the slot.

In at least some examples, the apparatus includes a stationary body, with the expansion clamp being configured to extend out of an aperture of the stationary body.

In at least some example approaches, the apparatus includes a stationary body, the stationary body comprising a stem extending from the base to a laterally extending latch foot configured to be received within the slot. In at least a subset of these examples, the expansion clamp is configured to push the latch foot against a load surface defined within the slot. The expansion clamp may be configured to push the latch foot in a first direction opposite a second direction of insertion of the latch foot into the slot.

In at least some examples, the bin comprises one or more flexible walls retained by a frame to define at least in part a storage volume.

In at least some examples, the apparatus further includes a gear tunnel shuttle that comprises the slot. The base may include an access door configured to provide access from an interior of the bin to an electrical supply of the gear tunnel shuttle.

In at least some example approaches, the apparatus includes a biasing member configured to be compressed by movement of the lever.

In at least some examples, the lever is positioned on an outer surface of the bin.

In at least some examples, a storage bin is provided that comprises a base, a frame extending from the base, one or more flexible walls retained by the frame, and an expansion clamp coupled to the base. The expansion clamp may be configured to be extended from the base to secure the base to a slot. The storage bin may also include a lever on an outer surface of the bin, the lever configured to actuate the expansion clamp.

In at least some examples, the storage bin includes a linkage configured to convert rotational motion of the lever to a linear motion of the expansion clamp.

In at least some example approaches, the storage bin includes a linkage connecting the lever to the expansion clamp and a slidable member secured to the linkage with a pivot, wherein the slidable member includes a cam configured to push a plunger of the expansion clamp, wherein the push causes the plunger to extend further into the slot.

In at least some example approaches, the storage bin includes a stationary body, the stationary body comprising a stem extending from the base to a laterally extending latch foot configured to be received within the slot, wherein the expansion clamp is configured to push the latch foot against a load surface defined within the slot.

In at least some examples, a gear tunnel shuttle comprises the slot and the base comprises an access door configured to provide access from an interior of the bin to an electrical supply of the gear tunnel shuttle.

In at least some example illustrations, a latch assembly is provided comprising a stationary body. The stationary body comprises a stem configured to extend from an apparatus carrying the latch assembly to a laterally extending latch foot configured to be received within a slot. The latch assembly also includes an expansion clamp configured to extend out of an aperture of the stationary body to secure the latch assembly to the slot, and a lever configured to be positioned on an outer surface of the apparatus. The lever is configured to actuate the expansion clamp.

In at least some examples, the latch assembly includes a linkage configured to convert rotational motion of the lever to a linear motion of the expansion clamp.

In at least some example approaches, the latch assembly includes a linkage connecting the lever to the expansion clamp and a slidable member secured to the linkage with a pivot. Additionally, the slidable member may include a cam configured to push a plunger of the expansion clamp, wherein the push causes the plunger to extend further into the slot.

In at least some examples, the expansion clamp is configured to push the latch foot in a first direction opposite a second direction of insertion of the latch foot into the slot.

In at least some examples, the expansion clamp is configured to push the latch foot against a load surface defined within the slot.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
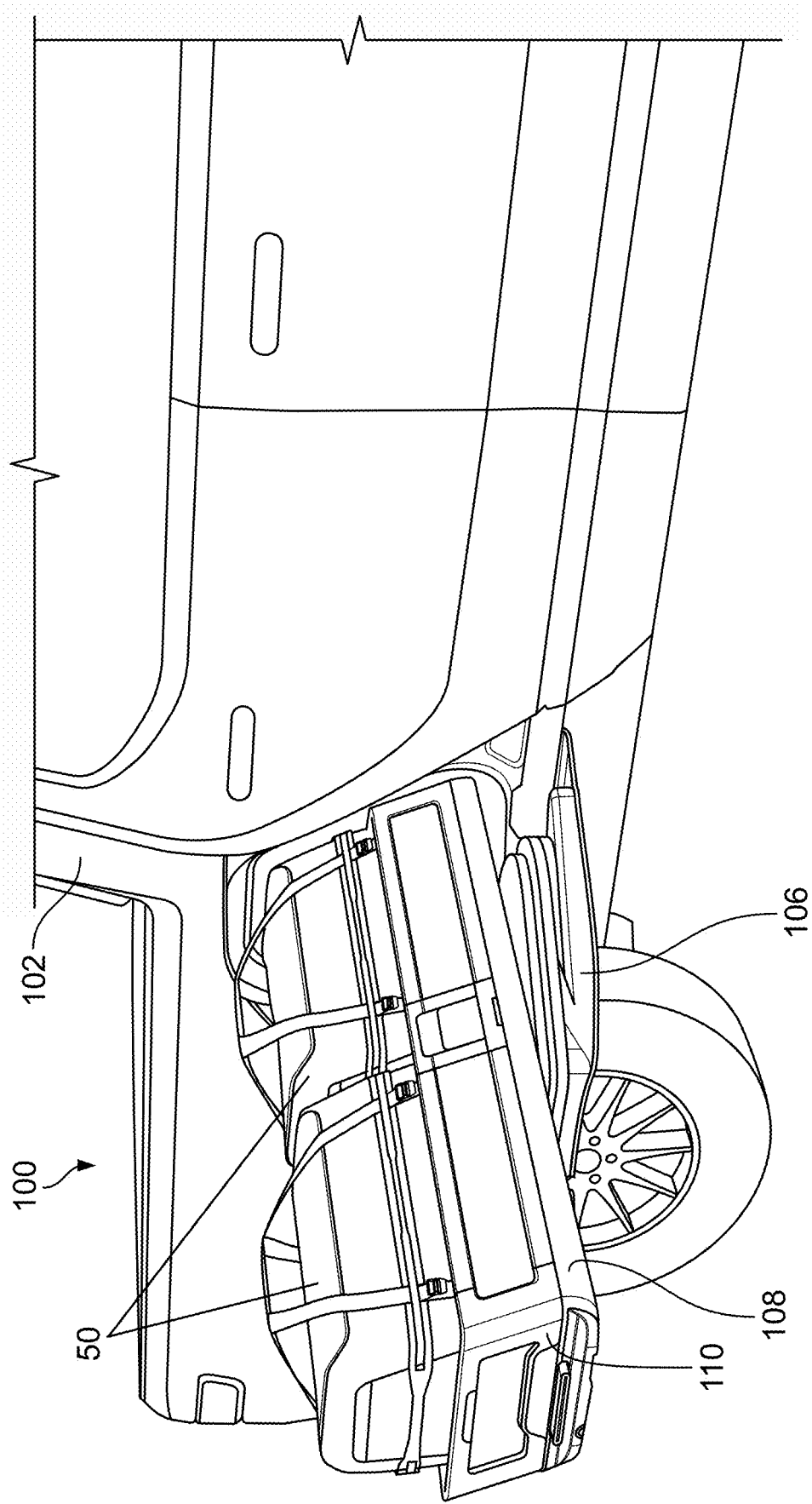
FIG. 1 shows a perspective view of a vehicle storage system with a platform module or gear tunnel shuttle, along with a storage bin, in accordance with some embodiments of the present disclosure.

Example illustrations are generally directed to a storage or cargo bin, e.g., for a vehicle. In examples herein, a vehicle has a gear tunnel, which may be an enclosed vehicle storage space for, merely as examples, sports equipment, vehicle accessories, or any other gear. The storage bins herein may generally allow users to move cargo and equipment in and out of the gear tunnel while keeping the contents contained. In an example, the gear tunnel includes a gear tunnel shuttle which slides in/out of the elongated gear tunnel to facilitate access to gear. The storage bin may have one or more latch assemblies that facilitate securement of the storage bin and objects contained therein to the gear tunnel shuttle, e.g., preventing the storage bin and/or objects therein from sliding with respect to the shuttle or falling off of the shuttle. As will be discussed further below, in examples herein latch assemblies may include an expansion clamp configured to extend into an engagement feature of the shuttle such as a slot. Further, the latching storage bin may eliminate any need to strap or otherwise secure items to the gear tunnel shuttle or otherwise within the gear tunnel. Accordingly, the storage bin can be mounted to and removed from the gear tunnel shuttle, providing a means to load items in bulk into the vehicle's gear tunnel and to move them, e.g., to a campsite, home, etc.

In at least some examples, one or more latch assemblies are provided that have an expansion clamp along a bottom of the storage bin, which interface with the gear tunnel shuttle. For example, as will be described further below, an expansion clamp may interface with slot of the gear tunnel shuttle and provide a locking mechanism which expands within the slot by actuation of a lever or handle of the storage bin. In an example, the slot defines a generally t-shaped cross-section, and as such may be a "t-slot." The expansion clamp may be inserted into the slot, with expansion of the expansion clamp generally locking the storage bin in place by engaging the slot of the gear tunnel shuttle, preventing the storage bin from shifting before a user is ready to remove the cargo bin, or while driving. The lever may be positioned on an outside surface of the storage bin, facilitating actuation of the expansion clamp when an interior of the storage bin is occupied, e.g., with gear. For example, the lever may be located on the outside of the cargo bin along a front surface thereof, with the expansion clamp extending downward into the slot of the shuttle from a generally central or middle portion of a base of the storage bin. In this manner, the expansion clamp may be laterally displaced from the lever for actuating the expansion clamp.

In at least some examples, the storage bin comprises a frame and a fabric wall assembly which generally conceals exposed fasteners, at least from outside the storage bin. As will be elaborated further below, frame members may be secured together by threaded members, with a corresponding threaded member such as a nut generally tightening the frame members together. The threaded members may generally be hidden from outside the storage bin when secured to the gear tunnel shuttle. In at least some examples, the fabric/cloth walls may include piping that is retained along upper/lower extruded rail sections of the frame and is pinned at the sides between corresponding clamshell halves.

Turning now to FIG. 1, an example vehicle storage system 100 is illustrated and described in further detail. The vehicle storage system 100 is implemented in a vehicle 102. More specifically, a storage area 104 is provided behind a passenger cabin of the vehicle, which is accessed via a storage door 106 on the passenger and/or driver side of the vehicle 102. The storage area 104 may be an auxiliary storage area or "gear tunnel" of the vehicle 102. As illustrated, the gear tunnel 104 is generally enclosed or otherwise partitioned from the passenger cabin, pickup bed, front trunk (e.g. "frunk"), etc. In an example, the gear tunnel 104 defines an enclosure or vehicle storage space for sports equipment, vehicle accessories, or any other gear. The enclosure of the gear tunnel 104 defines a generally parallelogram-shaped cross-section extending laterally through the vehicle 102. In any case, example storage bins may be employed in the context of the illustrated gear tunnel 104, or cargo areas having any other configuration that is convenient.

Figure 2:
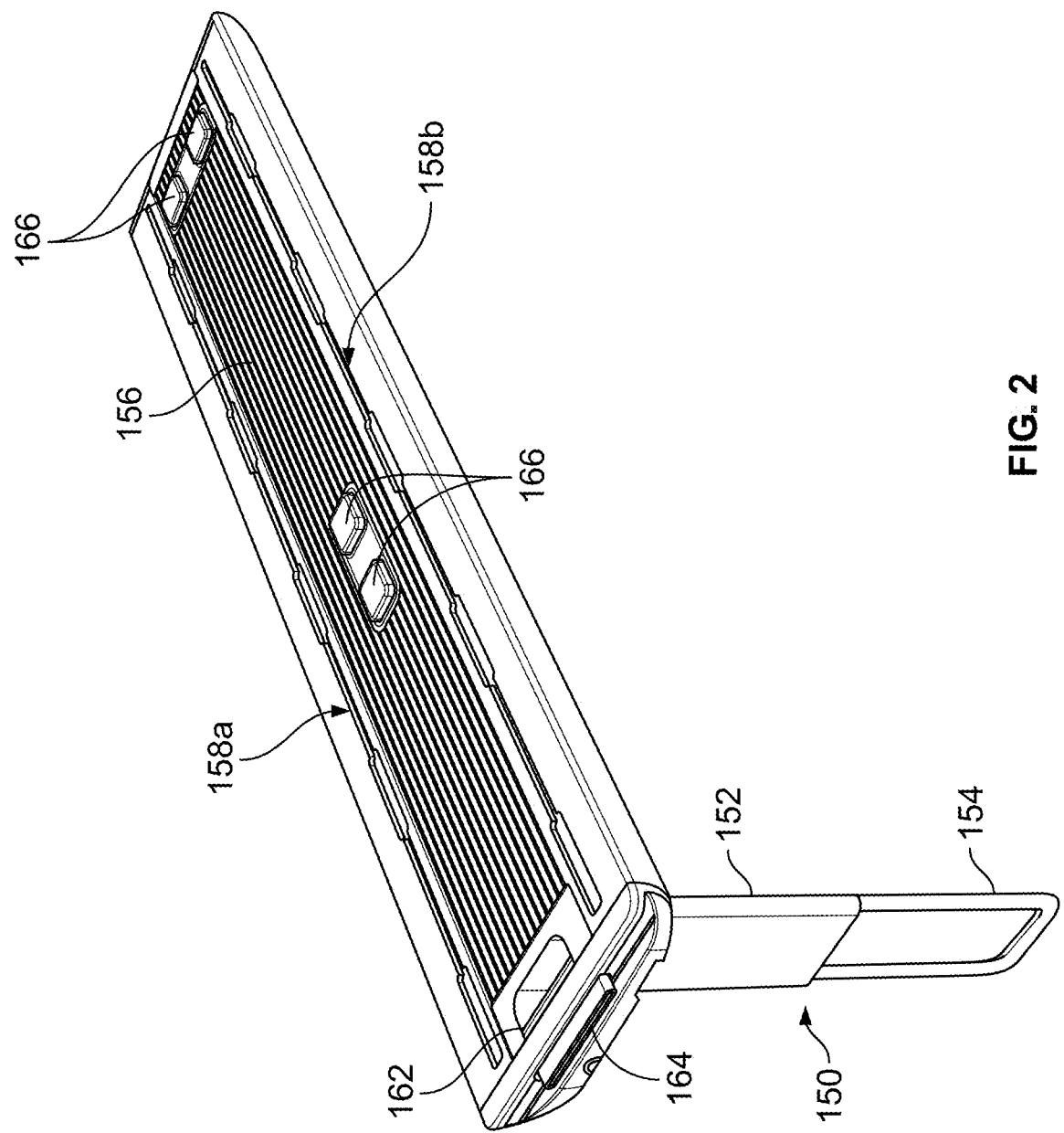
FIG. 2 shows a perspective view of the platform module of FIG. 1, in accordance with some embodiments of the present disclosure.
Figure 3:
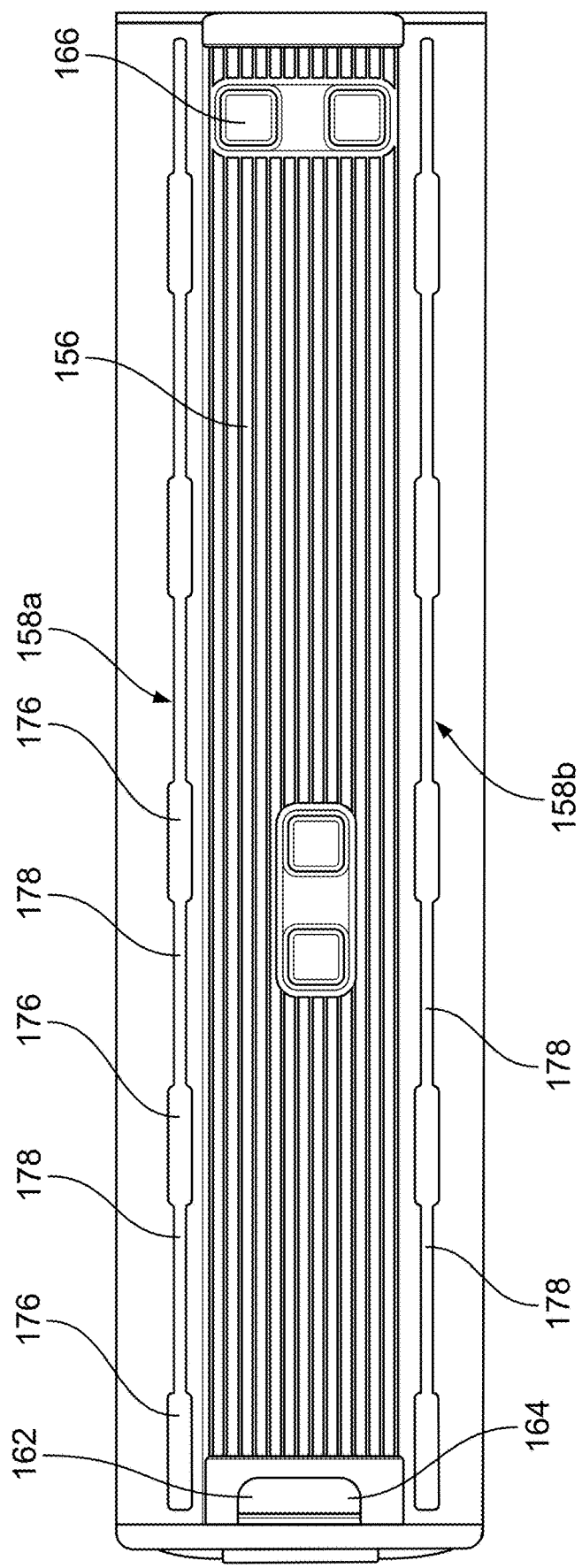
FIG. 3 shows a top view of the platform module of FIG. 1, in accordance with some embodiments of the present disclosure.

Referring now to FIGS. 1, 2, and 3, the system 100 may also include a platform module 108 comprising a generally planar platform that slides in/out of the gear tunnel 104. Generally, the platform module 108 facilitates loading/unloading of cargo within the gear tunnel 104 by sliding in/out of the gear tunnel 104 to provide easier access to stowed items and/or the gear tunnel 104. In an example, the platform module 108 is a gear tunnel shuttle. As will be described further below, a storage bin 110 may be latched or secured to the platform module 108. The storage bin 110 may be configured to hold gear such as sports equipment, luggage, or any other items that are convenient. As seen in FIG. 1, the storage bin 110 may be provided with one or more duffel bags 50 configured to fit within the storage bin 110 and gear tunnel 104.

The platform module 108 may include a leg 150 (e.g., telescoping members 152 and 154), movable member 156, slots 158a and 158b (collectively, 158), fixed handle 162, and release mechanism 164. Members 152 and 152 of leg 150 are configured to extend and retract relative to each other and may include one or more position detents. Leg 150 may include a support sensor to track if the leg is folded up and/or in the extended position. Leg 150 is configured to fold up to the underside of movable member 156 when release mechanism 164 is pulled. In some embodiments, release mechanism 164 may include a ratchet or other detent to define one or more positions. When release mechanism 164 is depressed, platform module 108 may be retracted or extended from a storage compartment of a vehicle, e.g., the gear tunnel 104 (e.g., fully or partially). A user may apply force to fixed handle 162 to pull or push platform module 108 (e.g., for extending or retracting). In an illustrative example, any of the illustrative platform modules of the present disclosure may include one or more handles, e.g., such as the fixed handle 162, to facilitate grasping or manipulating the platform module in/out of the gear tunnel 104. In some embodiments, movable member 156 slides along grooves of the gear tunnel 104 to allow extension and retraction. In some embodiments, movable member 156 includes a rail system that allows movable member 156 to be extended and retracted from gear tunnel 104. In some embodiments, a rail system may include one or more stationary components connected to the vehicle (e.g., bolted into the gear tunnel 104). In some embodiments, platform module 108 includes or interfaces to a stationary component that remains in gear tunnel 104. For example, the stationary component may be coupled to an electrical system, to provide electrical functionality to platform module 108. In some embodiments, platform module 108 may include a track system or conduit configured to provide electrical power to ports on the platform module.

Ports 166 may include electrical connectors. For example, in some embodiments, ports 166 include electrical terminals configured to provide or receive 12 VDC, 110 VAC, sensor signals, control signals, electrical power or signals at any other suitable voltage or character, or any combination thereof. To illustrate, ports 166 may include a plastic component with one or more alignment features to align to corresponding features of a submodule. To further illustrate, a submodule may include a mating connector that mates to one or more of ports 166 to couple an electrical system. A platform module may include any suitable number of ports, for coupling any suitable systems, arranged in any suitable configuration. In some embodiments, ports 166 need not engage with mating connectors when a submodule is installed. For example, in some embodiments, a submodule may, but need not, cover ports 166. In a further example, a user may engage a mating connector to one or more of ports 166 (e.g., a submodule may allow access to ports 166 when installed).

In an illustrative example, a rail system may be manually operated, automatically operated, or a combination thereof. For example, in some embodiments, a user may push and pull a portion of the rail system to retract or extend the platform module 108. In a further example, a user may push a button or otherwise provide an indication (e.g., on a key fob or touchscreen) to cause an actuator to retract or extend the rail system of the platform module 108.

As noted above, in some embodiments gear tunnel 104 may include an opening on each side of the vehicle, and accordingly, a platform module 108 (or rail system thereof) may be extended from either side of the vehicle (e.g., the gear tunnel 104 may include two doors 106, and be a through-recess in the vehicle. In such examples, platform module 108 (e.g., including a two-way travel rail system) may include a release mechanism 164 and fixed handle 162 on each side such that it may be pulled and retracted from either side.

As noted above, the movable member 156 of the platform module 108 comprises one or more slots 158, channels, or other engagement features. In the example illustrated, the slots 158a and 158b extend along a length of the movable member 156 or substantially so. The storage bins 110 may include expansion clamps, latches or other features configured to be engaged with the slot(s) 158, e.g., by extending into the slot(s) 158, to facilitate secure mounting of the storage bins 110 to the platform module 108.

Figure 4:
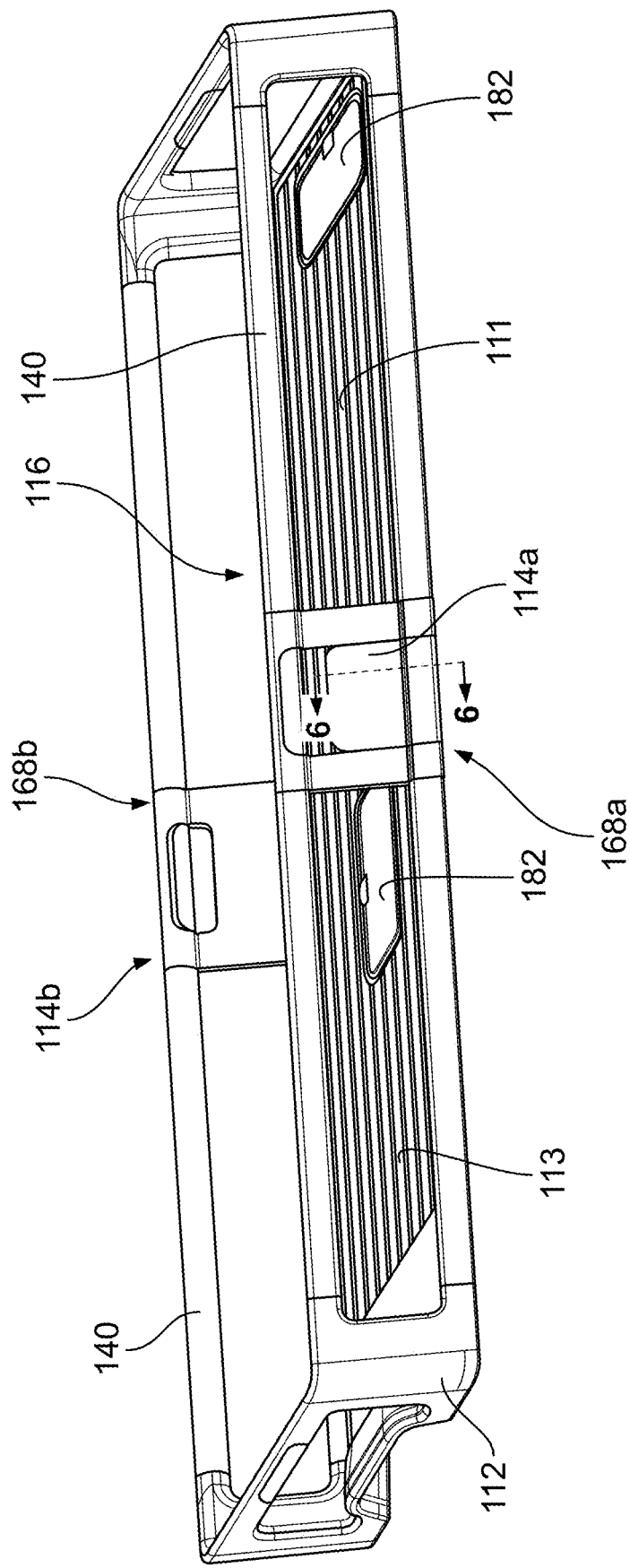
FIG. 4 shows a top perspective view of the storage bin of FIG. 1, in accordance with some embodiments of the present disclosure.
Figure 5:
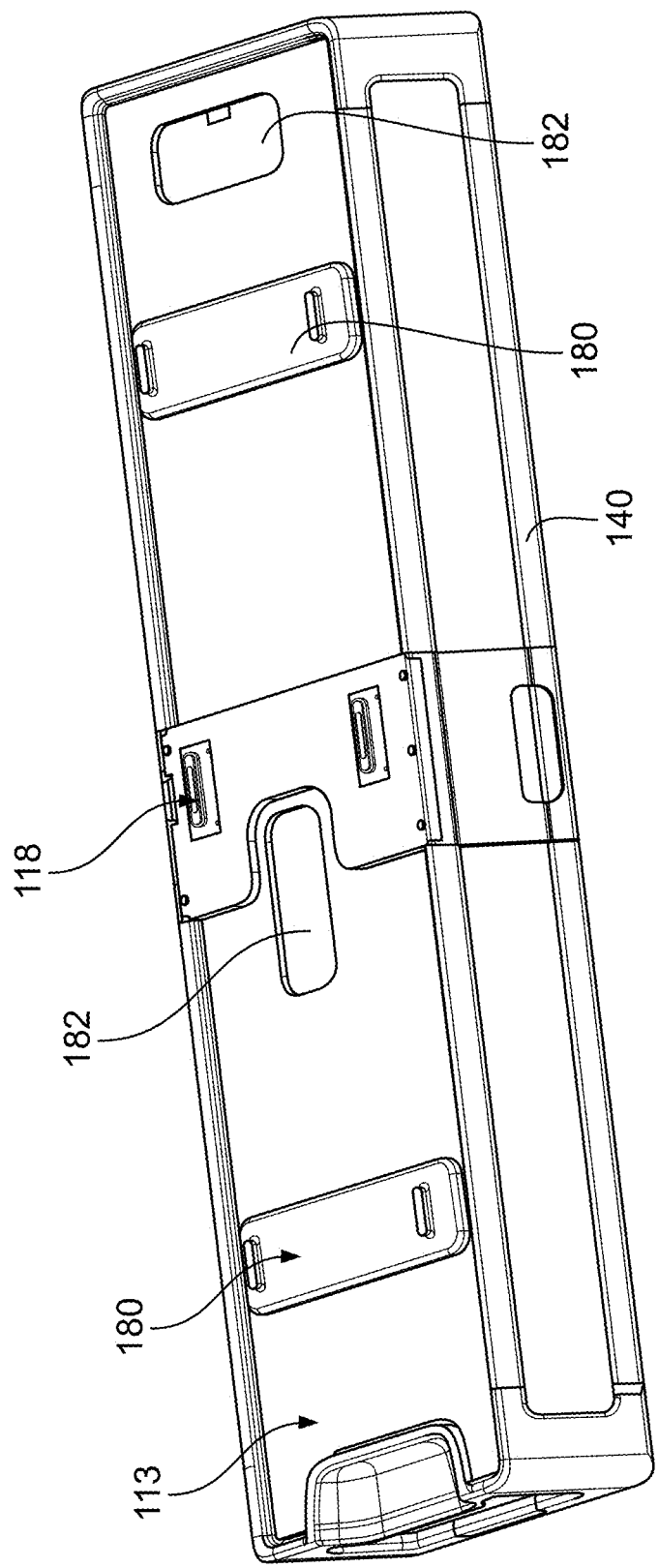
FIG. 5 shows a bottom perspective view of the storage bin of FIG. 1, in accordance with some embodiments of the present disclosure.

Referring now to FIGS. 1, 4 and 5, storage bin 110 is illustrated and described in further detail. Generally, the storage bin 110 comprises a frame 112 extending upwardly (e.g., relative to an up/down direction of the vehicle 102 and/or gear tunnel 104) or away from a bin base 113. The base 113 may generally define a floor or bottom surface of the bin 110, and may have a mat 111, e.g., formed of rubber or other high friction and/or compliant material to reduce the likelihood of objects stored within the bin 110 from being damaged due to vehicle movement or other movement of the bin 110. The frame 112 generally retains flexible walls, which cooperate with the base 113 to define a storage volume 116 of the bin 110, as will be described further below. The base 113 may be configured to be secured to the slot(s) 158 of the platform module 108 (not shown in FIGS. 4 and 5). For example, the storage bin 110 and/or base 113 may have one or more latch assemblies 168 actuating an expansion clamp 169. In the example illustrated, the storage bin 110 has two latch assemblies 168a and 168b having respective expansion clamps 169, with each being actuated by a respective movable handle or lever 114a and 114b (collectively, 114).

Figure 6:
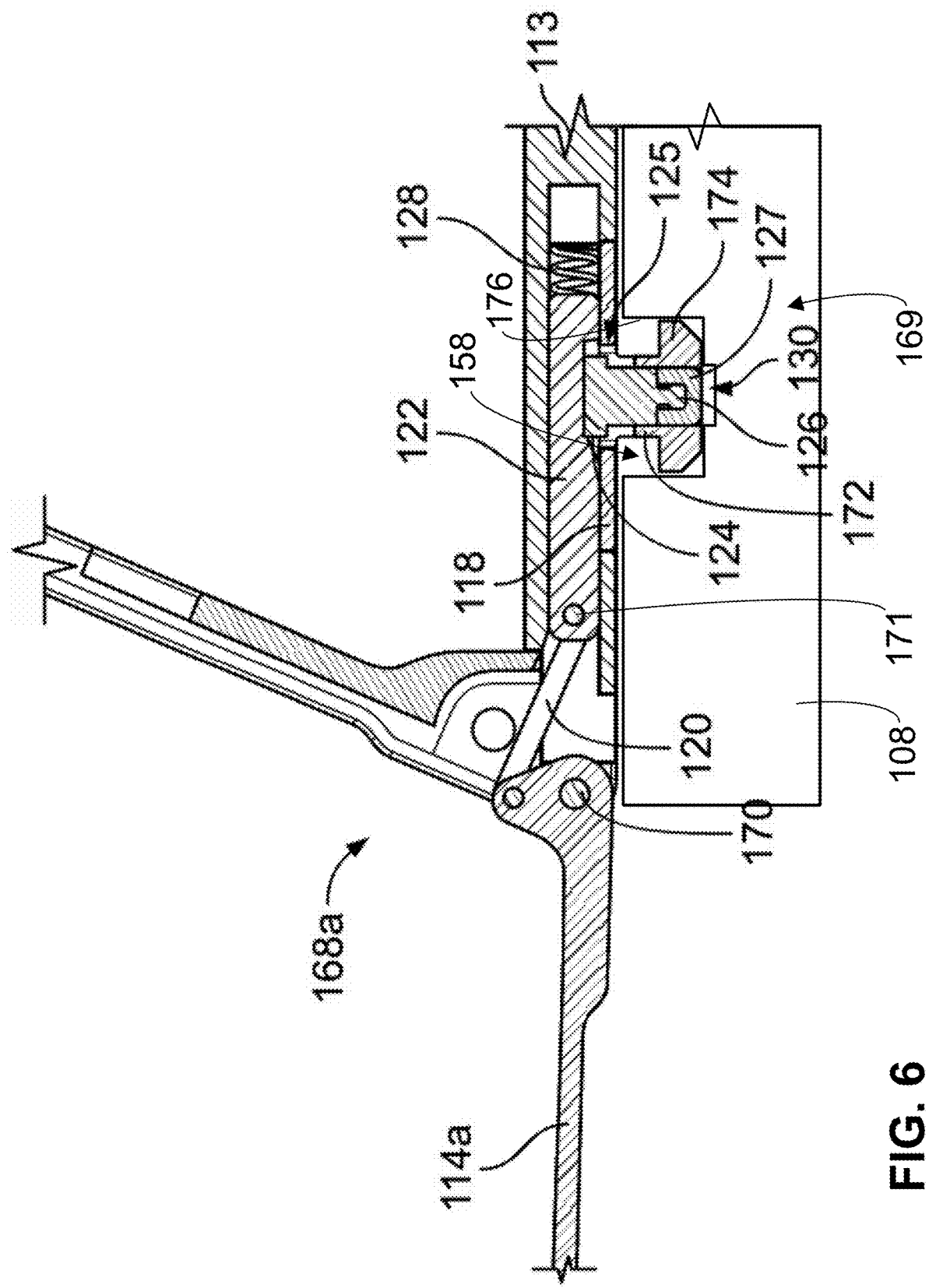
FIG. 6 shows a cross-sectional view of a lever or handle of the storage bin of FIG. 1, taken through line 6-6 of FIG. 4 to show the lever of the storage bin in an open/unlocked position, in accordance with some embodiments of the present disclosure.
Figure 7:
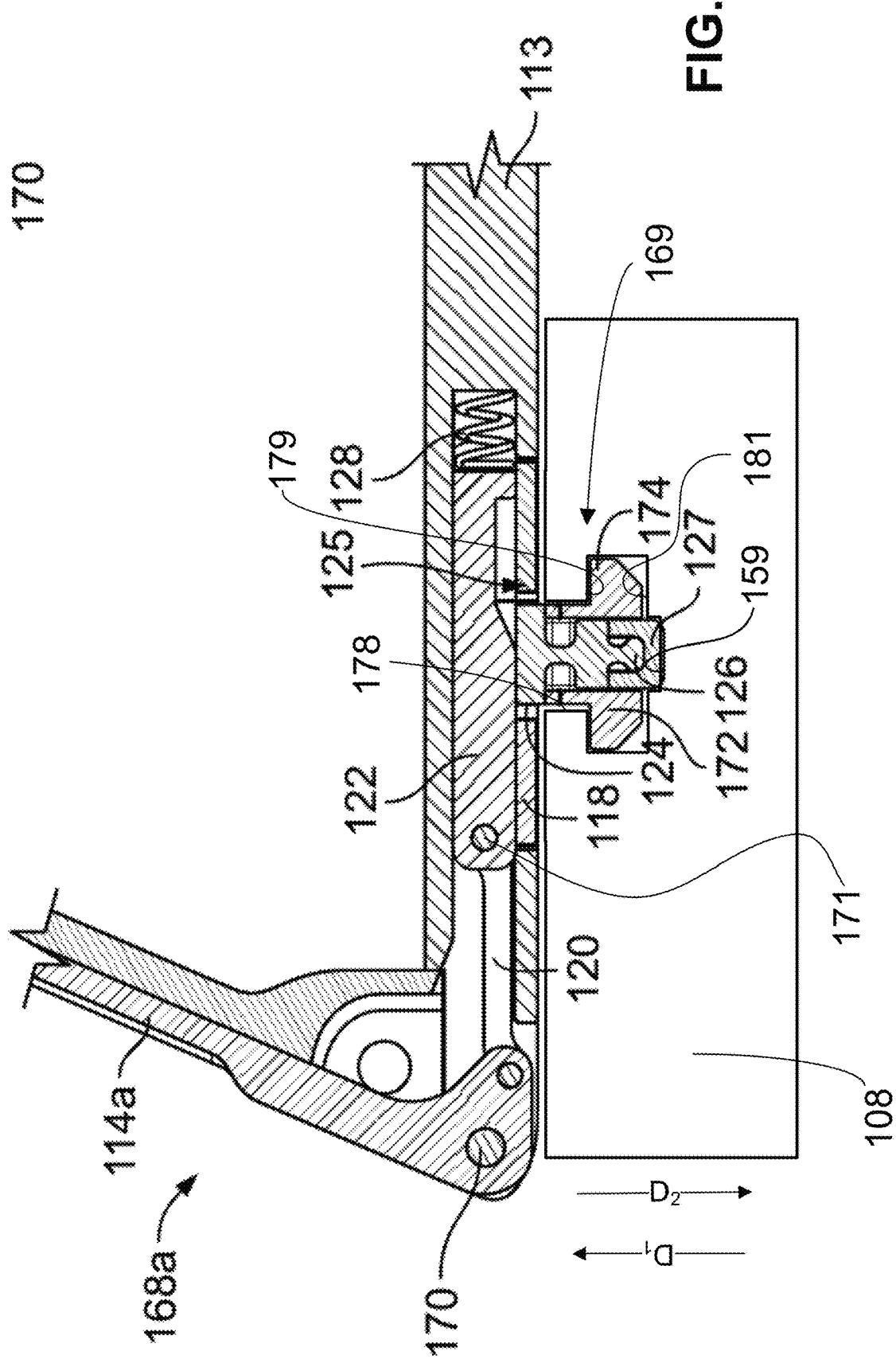
FIG. 7 shows the cross-sectional view of the lever of FIG. 6 to show the lever of the storage bin in a closed/locked position, in accordance with some embodiments of the present disclosure.
Figure 8:
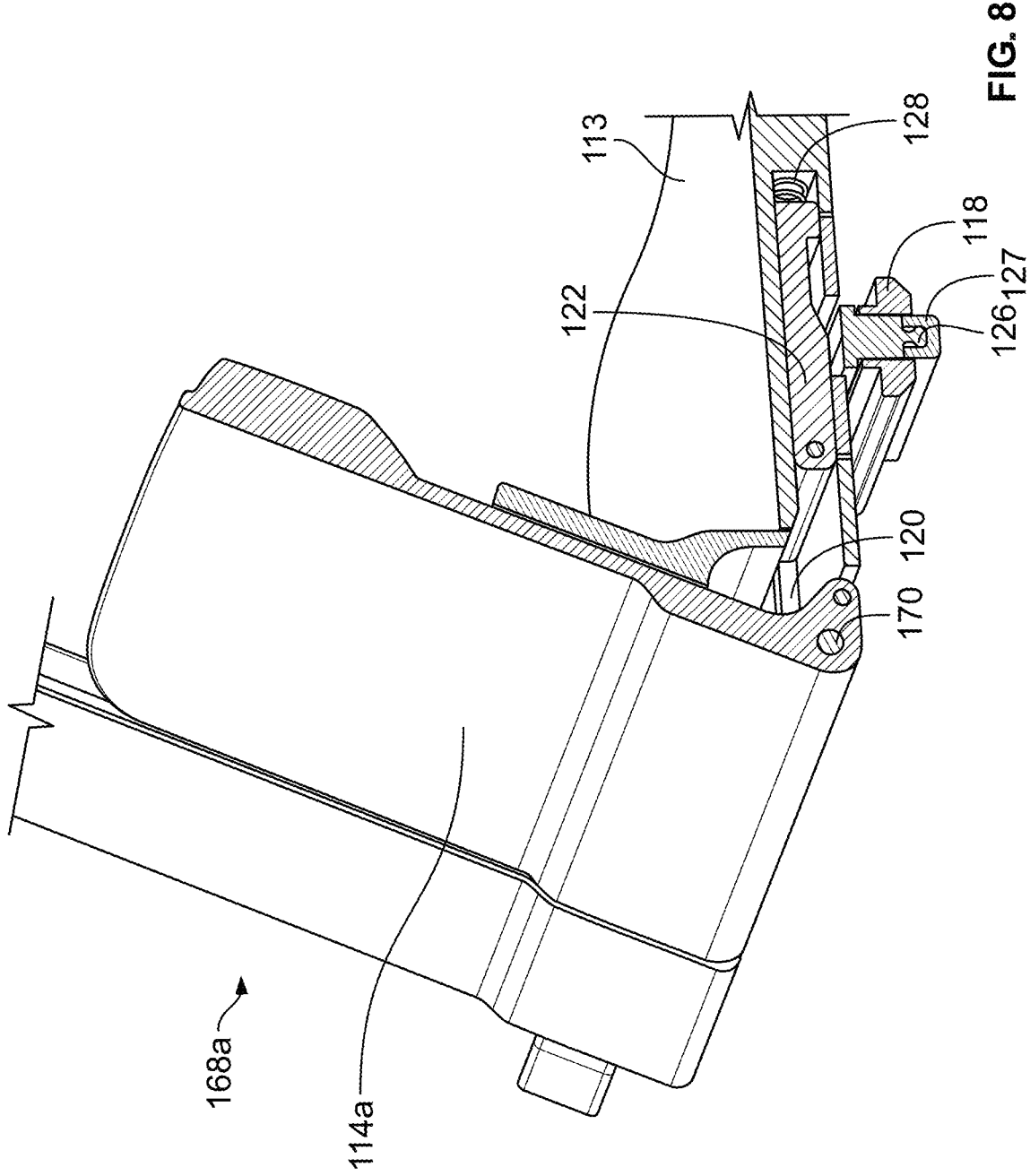
FIG. 8 shows a cutaway perspective view of the lever of the storage bin of FIG. 1 to show the lever of the storage bin in the closed/locked position, in accordance with some embodiments of the present disclosure.

Turning now to FIGS. 6-8, the latch assembly 168a and expansion clamp 169a are illustrated and described in further detail. While the latch assembly 168b is not shown in FIGS. 6-8, it should be understood that the latch assembly 168b operates in the same manner as illustrated in FIGS. 6-8 and described below.

The latch assembly 168a includes the lever 114a and expansion clamp 169. The expansion clamp 169 includes a stationary body 118 that is positioned on an underside of the base 113 of the storage bin 110. The body 118 of the expansion clamp 169 is positioned away from an outer perimeter of the storage bin 110 where the lever 114 is located. More specifically, the expansion clamp 169 is positioned along a bottom of the storage bin 110 such that it is received in the slot(s) 158 of the platform module 108 when the storage bin 110 is positioned on the platform module 108. In this manner, the expansion clamp 169 may be actuated by the lever 114 on the outside of the storage bin 110, with the body 118 interfacing with one of the slots 158 of the member 156. The lever 114, being on an outer surface of the bin 110, is at a location laterally spaced along the base 113 from the body 118. In this manner, the lever 114 may be actuated along an outside or outer perimeter of the storage bin 110, while the engagement between the latch assembly 168 and the platform module 108 occurs underneath the base 113. Accordingly, the lever 114 and expansion clamp 169 may be actuated without interference from objects within an interior volume of the storage bin 110, e.g., gear, luggage, sports equipment, etc.

The body 118 of the expansion clamp 169 is coupled to the base 113 such that the body 118 is generally fixed in place with respect to the base 113. For example, the body 118 may be secured to the base 113 with one or more fasteners, or via bonding or glue. The body 118 includes a relatively narrow stem 172 extending downward to a laterally extending latch foot 174, which is wider than the stem 172. The slots 158, as best seen in FIG. 3, may generally comprise an elongated channel having openings 176 spaced along a length thereof, with narrowed portions 178 in between the openings.

Referring now to FIGS. 6 and 7, securement of the expansion clamp 169 to the slot 158 is illustrated and described in further detail. As shown in FIG. 6, the openings 176 of the slot 158 may be wide enough such that the latch foot 174 of the body 118 may be inserted through the opening 176, e.g., by resting the bin 110 on the platform module 108, with the latch foot 174 protruding through the opening 176. The storage bin 110 may then be slid along the member 156, such that the latch foot 174 moves along the slot 158 until it is within the narrowed portion 178 of the slot 158. The narrowed portion 178 of the slot 158 retains the latch foot 174 within the slot 158 by preventing vertical movement of the latch foot 174 out of the slot 158. Accordingly, movement of the bin 110 relative to the member 156 is limited to a direction parallel to the extension of the slot(s) 158 along the member 156.

Referring now to FIG. 7, the storage bin 110 may be secured in place with respect to the platform module 108 by engaging the expansion clamp 169 with the slot 158. As noted above, the latch foot 174 may be positioned within the slot 158. The expansion clamp 169 may include a plunger 126, which is received in a latch body aperture 130 of the body 118 and is configured to engage the expansion clamp 169 with the slot 158. More specifically, the plunger 126 is movable within the aperture 130 with respect to the body 118, which may be in a vertical direction (i.e., with respect to the base 113 extending in a generally horizontal direction). Movement of the plunger 126 out of the aperture 130, e.g., further into the slot 158, may prevent movement of the body 118 with respect to slot 158a of the platform module 108 by preventing the latch foot 174 from being slid along the slot 158 to a position where the latch foot 174 may be withdrawn from the slot 158. For example, as will be discussed further below, extension of the plunger 126 may result in an expansion of the expansion clamp 169 within the slot 158, thereby preventing movement of the expansion clamp 169 and/or storage bin 110 relative to the slot 158.

Movement of the plunger 126 may be effected by the lever 114a. For example, the lever 114a may be moveable, e.g., by being pivotable about a pin 170. A linkage 120 is pivotally linked at a first end thereof to the lever 114a, and at a second end thereof to a slidable member 122 by way of a pivot 171. Accordingly, rotation of the lever 114a about the pin 170 causes the slidable member 122 to translate over the body 118. As illustrated in FIG. 6, the cam 124 is positioned laterally adjacent the plunger 126, with the plunger 126 biased upwardly into a recess 125 of the slidable member 122. For example, a spring or other resilient element may act between the plunger 126 and the body 118, biasing the plunger upwardly against the slidable member 122. Rotation of the lever 114a to the closed or locked position illustrated in FIG. 7 causes a cam 124 of the slidable member 122 to move over an upper end of the plunger 126, thereby forcing the plunger 126 downward such that a fitting 127 at a lower end of the plunger 126 protrudes out of the aperture 130 of the body 118. The fitting 127 may be forced against a bottom surface 181 of the slot 158. In the example illustrated in FIG. 7, a detent 159 in the bottom surface 181 slot 158 receives the fitting 127. The fitting 127 may urge the latch foot 174 upward and/or against an underside of the narrowed portion 178 of the slot 158. Accordingly, the expansion clamp 169 may push the latch foot 174 against a load surface 179 defined within the slot 158, e.g., by the narrowed portion 178. The load surface 179 generally faces the bottom surface 181 of the slot 158. The expansion clamp 169 may push the latch foot 174 in a first direction D1 opposite a second direction D2, with the second direction D2 being associated with the insertion of the latch foot 174 into the slot 158. With the lever 114a positioned as illustrated in FIG. 7, the body 118 is thereby secured to the slot 158 and/or the platform module 108 by the expansion of the expansion clamp 169 within the slot 158, preventing movement of the storage bin 110 with respect to the platform module 108. As detailed above, the linkage 120 converts rotational motion of the lever 114a to a linear motion of the slidable member 122, and in turn a linear motion of the expansion clamp 169, e.g., via the linear upward/downward movement of the plunger 126. The storage bin 110 may have one or more elongated bin feet 180, which may include projections that are seated within the slots 158, e.g., by being at least partially received therein. In some embodiments, the projections help maintain the position of storage bin 110 with respect to platform module 108 during installation or removal of storage bin 110.

With the storage bin 110 secured/latched to the platform module 108, devices within the storage bin 110 may access ports 166, e.g., to be charged or otherwise use electricity provided by the ports 166. In the example illustrated, access doors 182 may be provided permitting access from within the storage bin 110 to the ports 166. For example, the access doors 182 may permit access to the ports 166 through the base 113 of the bin 110. In other examples, the storage bin 110 may have an interface to the ports 166, e.g., along a bottom side of the base 113, and a power outlet or interior port that allows devices within the storage bin 110 to receive electrical power from the port(s) 166 via the interface. Accordingly, in some examples the storage bin 110 may include one or more power ports that can connect to the port(s) 166 of the platform module 108, e.g., to power devices or outlets in the storage bin 110.

Removal of the storage bin 110 from the platform module 108 may be effected generally by reversing the steps for securing the storage bin 110. More specifically, rotation of the lever 114a about the pin 170 and back to the unlocked position (see FIG. 6) will cause the plunger 126 and fitting 127 to recede into the aperture 130 of the body 118. The storage bin 110 may then be pushed to translate the latch foot 174 along the slot 158, bringing the latch foot 174 to the opening 176 and permitting the latch foot 174 to be withdrawn from the slot 158.

The latch assembly 168 also includes a biasing member 128. The biasing member 128 is configured to be compressed by the slidable member 122 in response to movement of the lever 114a. More specifically, as the lever 114a is brought toward the locked/closed position, the biasing member 128 is compressed, thereby resisting movement of the lever 114a to the locked position as the lever 114a is initially moved from the open/unlocked position of FIG. 6 to the closed/locked position of FIG. 7. However, as best seen in FIG. 7 the linkage 120 is pivotally linked to the lever 114a at a position below the pin 170 about which the lever 114*a* rotates. Accordingly, as the lever 114*a* approaches the closed/locked position illustrated in FIG. 7, the compression force of the biasing member 128 "snaps" the lever 114*a* into the closed/locked position and biases the lever 114*a* in a manner keeping the lever 114*a* in the closed/locked position. Accordingly, the biasing member 128 helps to maintain the lever 114*a* into whichever of the closed/open positions into which a user places the lever 114*a*.

Figure 11:
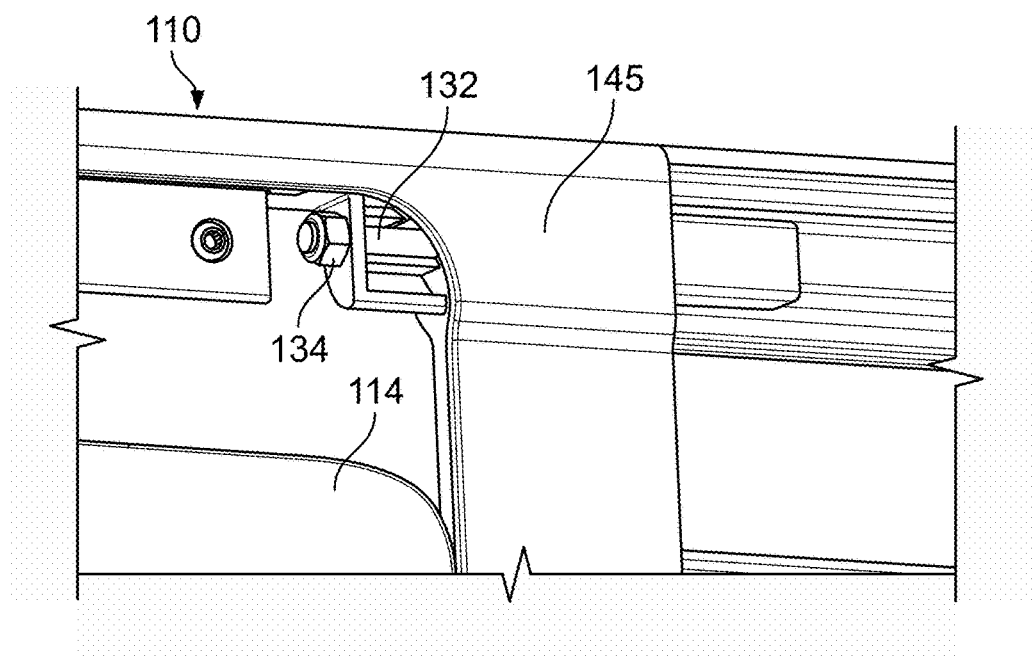
FIG. 11 shows a perspective view of a section of the storage bin of FIG. 1 enlarged to show a threaded member assembly for securing rails of the bin together, in accordance with some embodiments of the present disclosure.
Figure 12:
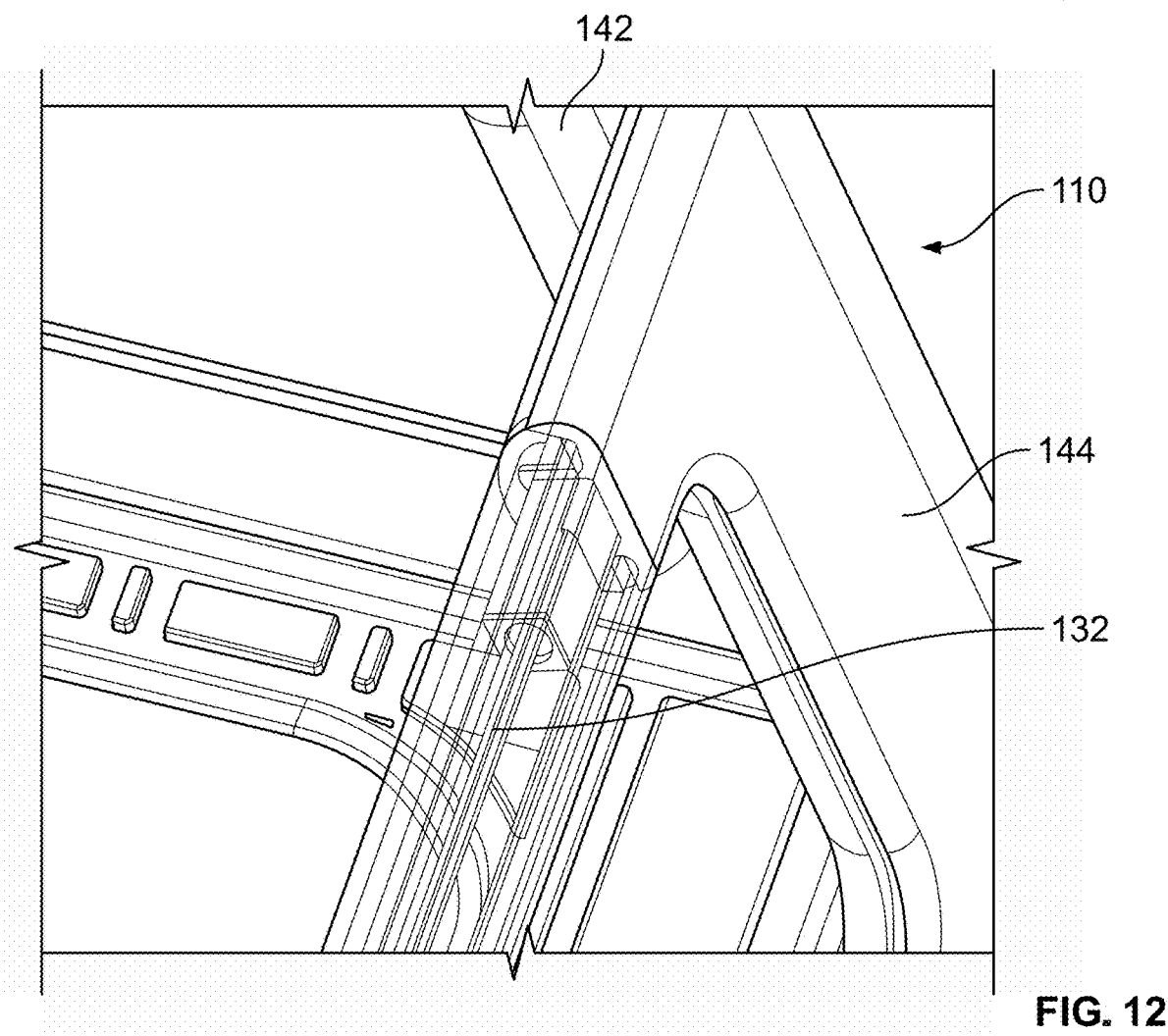
FIG. 12 shows another perspective view of a section of the storage bin of FIG. 1 enlarged to show an opposite end of the threaded member assembly of FIG. 11, in accordance with some embodiments of the present disclosure.
Figure 13:
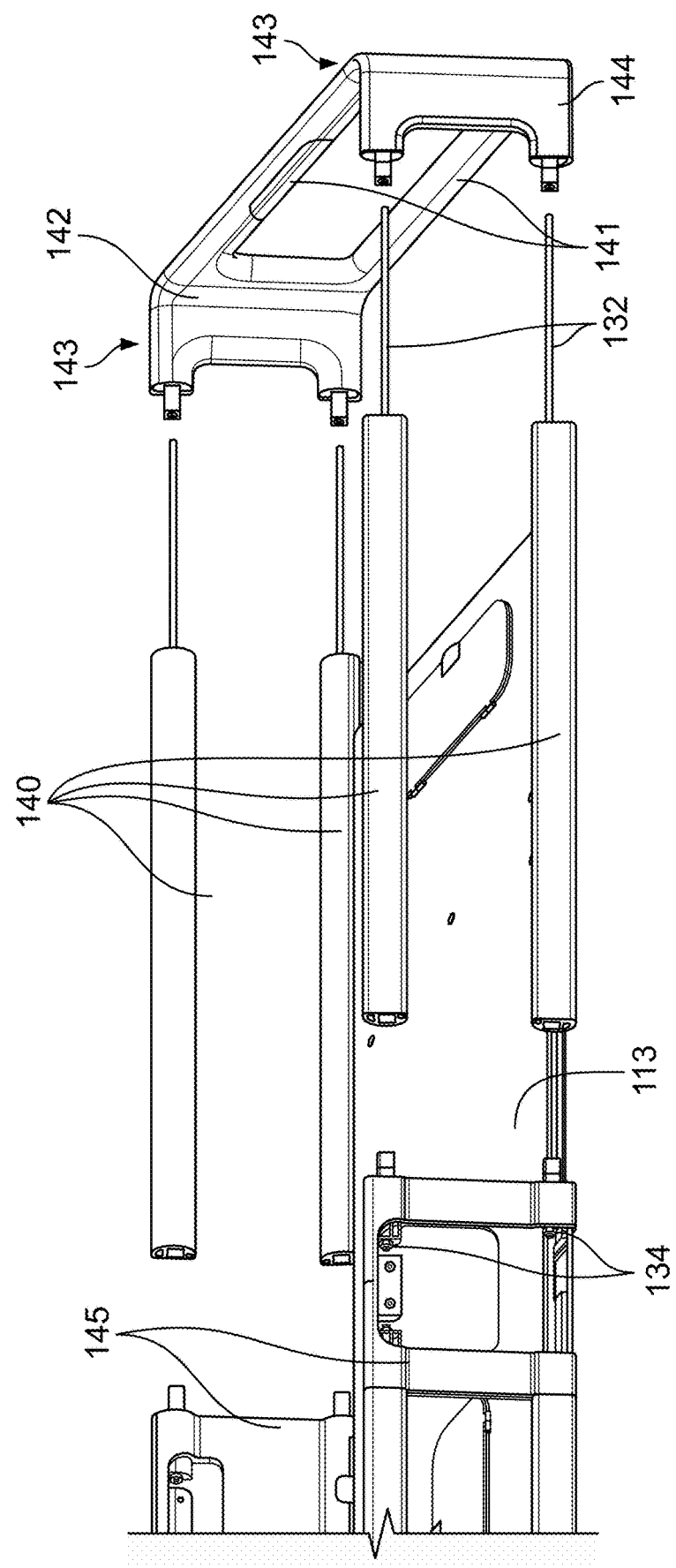
FIG. 13 shows a perspective view of a section of the storage bin of FIG. 1 partially disassembled, in accordance with some embodiments of the present disclosure.

Turning now to FIGS. 4, 5, and 9-13, the storage bin 110 is illustrated and described in further detail. As noted above, the storage bin 110 generally comprises a base 113 and a frame 112 extending upwardly or away from the base 113 to define the storage volume 116. As seen in FIG. 13, the frame 112 comprises a plurality of rails 140 and 141 that are secured together with corresponding threaded members 132. More specifically, the rails 140 and 141 are secured to corner structures 143 and handle structures 145 with corresponding threaded members 132. As seen in FIG. 11, one end of threaded members 132 may be retained to the handle structures 145 with a nut 134. The corner structures 143 may each comprise an inner endcap or clamshell half 142 and an outer endcap or clamshell half 144, which may be retained together in any manner that is convenient, e.g., via threaded members or clips. In an example illustrated in FIG. 10, each of the inner clamshell halves are provided with a plurality of boss structures 147 for securing each inner clamshell half 142 to its corresponding outer clamshell half 144 (not shown in FIG. 10). More specifically, a bolt, screw, or the like may be extended through the boss 147 to engage the outer clamshell half 144, thereby clamping the inner/outer clamshell halves 142/144 together. The threaded members 132 may be engaged with threaded structures within the clamshell halves 142/144 or may be retained within the corner structures 143 with another nut, merely as examples.

Rails 140 are secured to the handle structure 145 at one end and to the corner structures 143 at an opposite end. More specifically, threaded member 132 extends through each rail 140 and is clamped to the handle structure 145 with a nut 134 at a first end of the threaded member 132. A nut (not shown) may clamp the opposite end of the threaded member 132 to the corner structure 143. Corresponding threaded members and corresponding nuts (not shown) may retain the relatively shorter side rails 141 to their respective corner structures 143. The rails 140 and 141 may each facilitate handling of the storage bin 110, e.g., by allowing a user to grip various areas of the storage bin 110 to facilitate loading and unloading of the storage bin 110 to the platform module 108, lifting/carrying the storage bin 110 to/from vehicle 102, etc.

Figure 9:
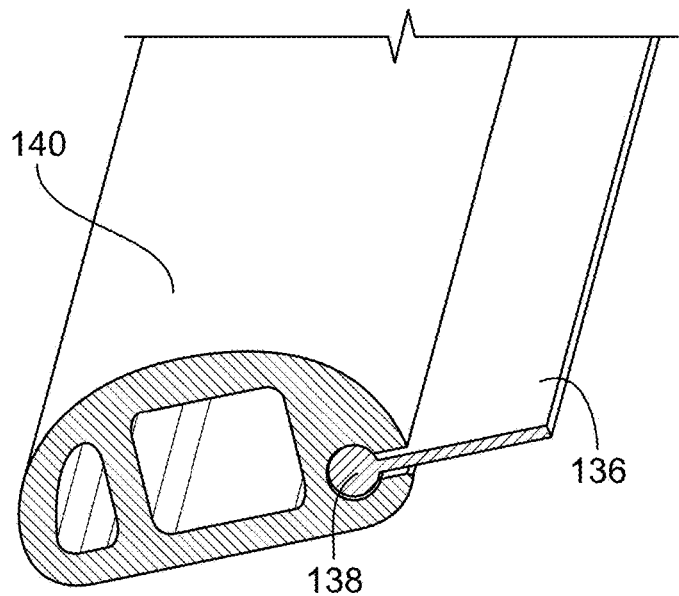
FIG. 9 shows a cutaway view of the storage bin of FIG. 1 to show a flexible wall member and rail of the storage bin, in accordance with some embodiments of the present disclosure.
Figure 10:
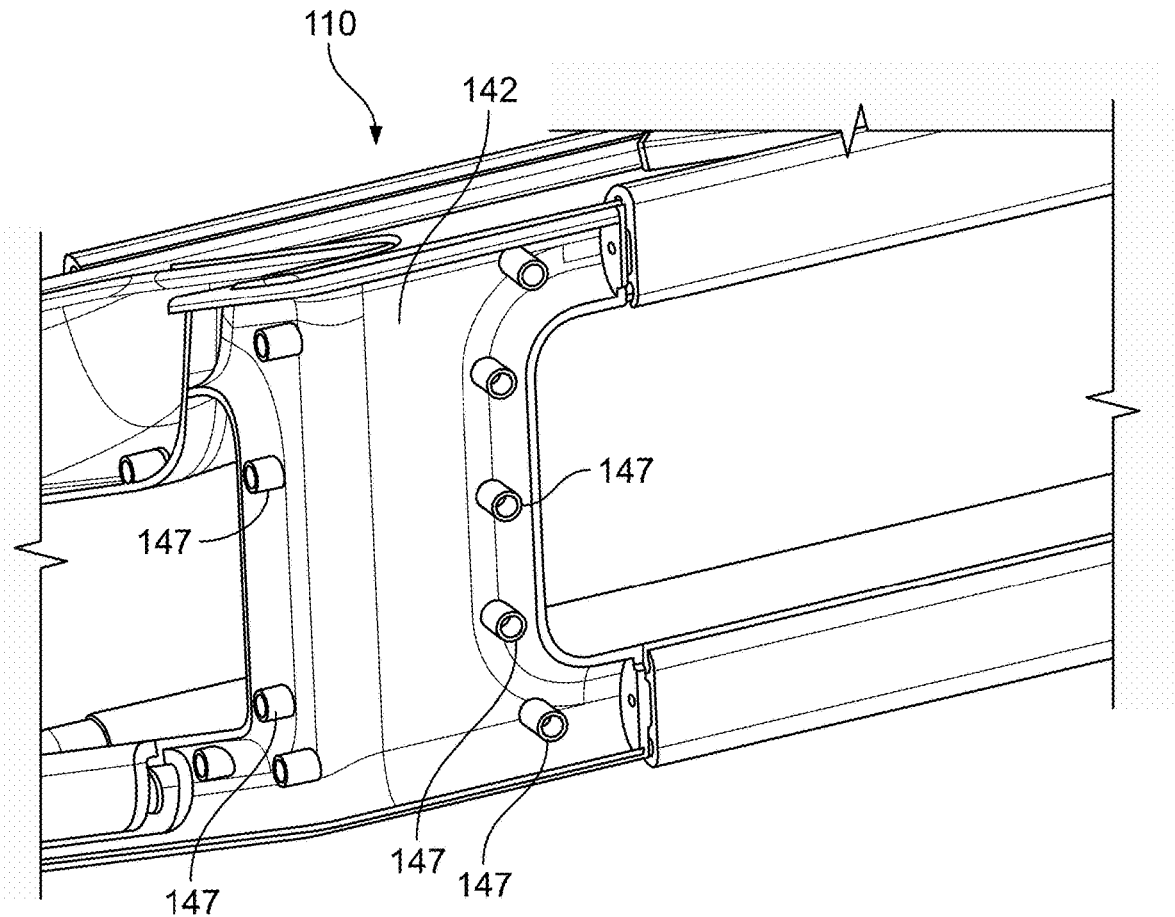
FIG. 10 shows a perspective view of the storage bin of FIG. 1 partially disassembled to show an interface of a clamshell member of the bin with rails of the bin, in accordance with some embodiments of the present disclosure.

The rails 140 may each retain a piping 138 of flexible walls 136, as best seen in FIG. 9 (which illustrates a section of the rails 140, which are more fully shown in FIGS. 1, 4, and 5). The walls 136 may be formed of cloth, fabric, or any other flexible material that is convenient. The piping 138 may extend along upper and lower edges of the walls 136, such that two rails 140 may retain piping 138 at opposite ends of a wall 136, thereby retaining the wall 136. The piping 138 may be pinned or retained within a corresponding cavity 139 extending along each of the rails 140. The walls 136 may be assembled to the rails 140 by inserting the piping 138 lengthwise into the rails 140. Subsequently, the rails 140 may be attached to the handle structures 145 and corner structures 143 by the threaded members 132 and nut 134 as discussed above. The assembly of the rails 140 to the handle structures 145 and corner structures 143 may also generally prevent the piping 138 from sliding out of the cavities 139 of the rails 140. While not specifically illustrated, the side rails 141 may have similar features for retaining their respective flexible walls 136, i.e., piping of the walls 136 retained within cavities of the rails 141. The rails 140 and/or 141 may be formed in any process that is convenient, e.g., extruding.

The threaded members 132 may generally be concealed from view, at least from outside the storage volume 116 after assembly. For example, as noted above and seen in FIG. 12, the threaded member 132 is secured within the clamshell halves 142, 144 by a corresponding threaded cavity defined by one or both clamshell halves 142, 144, or by a nut.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. An apparatus, comprising:
 a bin comprising:
 an expansion clamp coupled to a base of the bin, wherein the expansion clamp comprises a plunger;
 a lever of the bin configured to actuate the expansion clamp; and
 a linkage connecting the lever to a slidable member with a pivot, wherein the slidable member comprises a cam configured to cause the plunger to extend further into a slot from the base to secure the base to the slot.

2. The apparatus of claim 1, wherein the linkage is configured to convert a rotational motion of the lever to a linear motion of the plunger.

3. The apparatus of claim 1, wherein the expansion clamp further comprises a stationary body, wherein the plunger is configured to extend out of an aperture of the stationary body.

4. The apparatus of claim 1, wherein the expansion clamp further comprises a stationary body, the stationary body comprising a stem extending from the base to a laterally extending latch foot configured to be received within the slot.

5. The apparatus of claim 4, wherein the latch foot is configured to push against a load surface defined within the slot, the push being in a first direction opposite a second direction of insertion of the latch foot into the slot.

6. The apparatus of claim 1, wherein the bin comprises one or more flexible walls retained by a frame to define at least in part a storage volume.

7. The apparatus of claim 1, further comprising a gear tunnel shuttle that comprises the slot, wherein the base comprises an access door configured to provide access from an interior of the bin to an electrical supply of the gear tunnel shuttle.

8. The apparatus of claim 1, further comprising a biasing member configured to be compressed by movement of the lever.

9. The apparatus of claim 1, wherein the lever is positioned on an outer surface of the bin.

10. A storage bin, comprising:
 a base;
 a frame extending from the base;
 one or more flexible walls retained by the frame;

an expansion clamp coupled to the base, wherein the expansion clamp comprises a plunger;

a lever on an outer surface of the storage bin, the lever configured to actuate the expansion clamp; and a linkage connecting the lever to a slidable member with a pivot, wherein the slidable member includes a cam configured to cause the plunger to extend into a slot from the base to secure the base to the slot.

11. The storage bin of claim 10, wherein the linkage is configured to convert a rotational motion of the lever to a linear motion of the plunger.

12. The storage bin of claim 10, wherein the expansion clamp further comprises a stationary body, the stationary body comprising a stem extending from the base to a laterally extending latch foot configured to be received within the slot, wherein the latch foot is configured to push against a load surface defined within the slot.

13. The storage bin of claim 10, wherein a gear tunnel shuttle comprises the slot, wherein the base comprises an access door configured to provide access from an interior of the bin to an electrical supply of the gear tunnel shuttle.

14. A latch assembly, comprising:

an expansion clamp configured to secure the latch assembly to a slot, wherein the expansion clamp comprises a latch foot, a plunger, and a stem extending to the latch foot, and wherein the latch foot is configured to be received in the slot;

a lever configured to be positioned on an outer surface of an apparatus; and a linkage connecting the lever to a slidable member with a pivot, wherein the slidable member comprises a cam configured to cause the plunger to extend further into the slot.

15. The latch assembly of claim 14, wherein the linkage is configured to convert a rotational motion of the lever to a linear motion of the plunger.

16. The latch assembly of claim 14, wherein the latch foot is configured to push in a first direction opposite a second direction of insertion of the latch foot into the slot.

17. The latch assembly of claim 14, wherein the latch foot is configured to push against a load surface defined within the slot.

* * * * *